US007035626B1

(12) United States Patent
Luciano, Jr.

(10) Patent No.: US 7,035,626 B1
(45) Date of Patent: Apr. 25, 2006

(54) REMOTE GAMING USING CELL PHONES WITH LOCATION AND IDENTITY RESTRICTIONS

(75) Inventor: Robert A. Luciano, Jr., Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 226 days.

(21) Appl. No.: 10/706,272

(22) Filed: Nov. 12, 2003

Related U.S. Application Data

(60) Provisional application No. 60/426,570, filed on Nov. 14, 2002.

(51) Int. Cl.
*H04Q 7/20* (2006.01)

(52) U.S. Cl. .............................. 455/414.1; 455/456.3; 455/422.1; 463/39

(58) Field of Classification Search ............ 455/414.1, 455/456.1, 456.3, 410, 411, 414.2, 422.1, 455/412.1, 41.2; 463/25, 28, 29, 39, 40, 463/41
See application file for complete search history.

(56) References Cited

U.S. PATENT DOCUMENTS

| | | | | |
|---|---|---|---|---|
| 4,799,683 | A * | 1/1989 | Bruner, Jr. | 463/31 |
| 5,800,268 | A * | 9/1998 | Molnick | 463/40 |
| 5,999,808 | A | 12/1999 | LaDue | |
| 6,035,189 | A * | 3/2000 | Ali-Vehmas et al. | 455/414.1 |
| 6,104,815 | A * | 8/2000 | Alcorn et al. | 380/251 |
| 6,139,431 | A | 10/2000 | Walker et al. | |
| 6,358,151 | B1 | 3/2002 | Enzminger et al. | |
| 6,470,180 | B1 | 10/2002 | Kotzin et al. | |
| 6,527,641 | B1 | 3/2003 | Sinclair et al. | |
| 6,573,824 | B1 | 6/2003 | Lovegreen et al. | |
| 6,585,598 | B1 * | 7/2003 | Nguyen et al. | 463/41 |
| 6,595,855 | B1 | 7/2003 | Sako | |
| 6,628,939 | B1 | 9/2003 | Paulsen | |
| 6,702,672 | B1 * | 3/2004 | Angell et al. | 463/25 |
| 6,837,789 | B1 * | 1/2005 | Garahi et al. | 463/29 |
| 6,846,238 | B1 * | 1/2005 | Wells | 463/39 |
| 2002/0147049 | A1 * | 10/2002 | Carter | 463/42 |
| 2003/0104865 | A1 * | 6/2003 | Itkis et al. | 463/39 |
| 2005/0070358 | A1 * | 3/2005 | Angell et al. | 463/39 |
| 2005/0101383 | A1 * | 5/2005 | Wells | 463/39 |
| 2005/0176507 | A1 * | 8/2005 | Ephrati et al. | 463/39 |

* cited by examiner

*Primary Examiner*—Sonny Trinh

(57) ABSTRACT

Disclosed is a remote lottery ticket purchasing or gaming event bet placement system using E-911 compliant cell phones. E-911 compliant cell phones provide the location of the caller, enabling the system of the present invention to determine in which jurisdiction the caller is located. The system further uses at least one identifier that the caller must provide, allowing an age check to be made. The use of both pieces of information, location and age, is used by the system to remotely purchase lottery tickets or make bets in full legal accordance with what is allowed in the caller's jurisdiction.

3 Claims, 7 Drawing Sheets

Cell Phone Functionality For Use With Present Invention

E-911 Compliant All Levels

Level 1 – Text Messaging

Level 2 – Application Enabled (e.g., Java Scripts)

Level 3 – Built-In Digital Camera

Level 4 – Dedicated Non-Volatile RAM

Cell Phone Functionality For Use With Present Invention

E-911 Compliant All Levels

Level 1 – Text Messaging

Level 2 – Application Enabled (e.g., Java Scripts)

Level 3 – Built-In Digital Camera

Level 4 – Dedicated Non-Volatile RAM

Remote Player Location Using E-911 Enabling Technology:
GPS; Signal Strength/Triangulation; Other

Figure 3

Biometric Identifiers

Voice – Use Standard Voice Interface

Facial Recognition – Use Digital Camera

Fingerprint – Use Plug-In Card Or Print-Enabled Phone

Lottery System

Gaming System

Using Cell-Based Telephony In A Lottery System

Using Cell-Based Telephony In A Gaming System

REMOTE GAMING USING CELL PHONES WITH LOCATION AND IDENTITY RESTRICTIONS

RELATED APPLICATIONS

This application claims priority from provisional application 60/426,570 filed on Nov. 14, 2002.

BACKGROUND

1. Field of the Invention

This invention pertains generally to games of chance played using remote location technologies. More particularly, the present invention allows a player to participate in remote bet placement, while simultaneously providing location information on the bettor so that the casino or other game provider can enforce wagering only from places jurisdictions) where it is legal.

2. The Prior Art

Legal game play varies widely from state to state, from the most liberal gaming laws and games found in Nevada casinos to the virtually non-existent gaming (except, of course, for the state itself!) found in a state like Massachusetts. Until recently a person's ability to play games was limited to being physically present at the game's location. This precluded any need to verify the location of the person: if the game was in a legal jurisdiction, so was the person. Further, once a person was age-verified at a gaming establishment entrance no further age-related checks were needed.

All this has changed with advent of remote location gaming, primarily enabled by the internet. Any person having access to a home computer can (legally or not) participate in gambling using readily available, mostly off-shore, gambling sites. Because of the legal liability associated with enabling a person from an intra-US jurisdiction where gambling is illegal to gamble in a jurisdiction where it is legal, honest gaming operators in the US have been largely precluded from this market.

There is a need to provide gaming operators within the US with a way to enable the use of remote gaming by providing the needed legal assurance of physical locality and adequate age verification of the players.

BRIEF DESCRIPTION OF THE INVENTION

The present invention provides for a system and method allowing remote (off-site, not taking place in person in a casino, at a convenience store counter, etc.) betting using a cell phone. The system and method requires the use of an E-911 compliant cell phone (ref: provisional application 60/426,570 filed on Nov. 14, 2002). E-911 compliant cell phones are enabled for positional placement within the parameters explained in provisional application 60/426,570, generally within several hundred yards. Upon receipt of a call from an E-911 cell phone, the caller then makes use of an initial identifier. This initial identifier can be a PIN or a credit card number (or debit card or similar bank-issued card), or other reasonably unique identifier.

The system receives the phone call data (location data and initial identifier), and makes a determination of the applicable laws regarding the purchase of lottery tickets or placing bets at a casino (or virtual casino) accordingly. For example if the caller is calling from a Nevada location, the only applicable restriction is the caller's age. If calling from a Massachusetts location, the restrictions will both age-related and be limited to the purchase of lottery tickets.

The system uses available telephony equipment and software for the traditional portion of the system: associating the incoming voice and other data (numeric data, encoded biometric data, encoded caller program input data) with a single phone call, also called a phone session. The data and associated internal information may be kept in a database or other means, such as session-based saved state in a complex call-session state machine implemented in software.

The system further comprises additional software that uses the location and age data to determine applicable gaming or lottery restrictions (in some jurisdictions, this will be applicable to betting on live events such as horse racing, dog racing, etc.). In one preferred embodiment, there will be a look-up tree or table which maps each state (plus the District of Columbia) and a cut-off age (typically either 18 or 21) to an allowed betting configuration. For example, a call originating from within Massachusetts where the caller provided an initial identifier that maps to an age of "greater than or equal to 21" would allow the purchase of lottery tickets only.

In addition, the present invention provides for on-going checks of the caller's ID by using a second identifier, that second identifier being a biometric identifier. After an initial transaction or age-check using the initial identifier, the caller uses a cell-phone feature (explained more fully below) to send a biometric identifier to the system. At the start of each transaction (may also be immediately at the end of each transaction, or alternatively may be requested at random intervals by the system), this second identifier is re-sent and checking against that initially received. They must match for the session to continue.

BRIEF DESCRIPTION OF THE DRAWINGS

FIG. 3 is a list of cell phone function levels.

DESCRIPTION OF THE INVENTION

Figure 1:
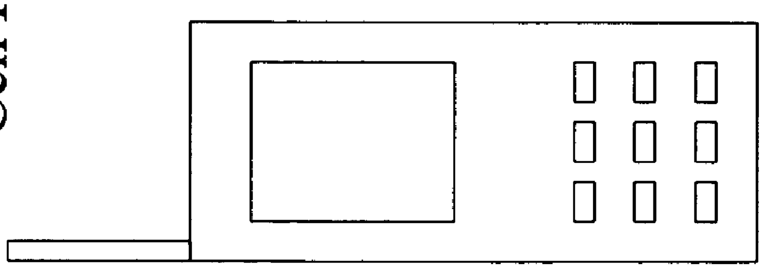
FIG. 1 shows levels of cell phone functionality usable with the present invention.

Persons of skill in the art will realize that the following description of the present invention is for illustrative purposes, and is not limiting. Other embodiments of the invention will readily suggest themselves to persons having skill in the art and having the benefit of this disclosure.

Referring to the drawings, for illustrative purposes the present invention is shown embodied in FIGS. 1 through 7. It will be appreciated that the apparatus may vary as to configuration and as to various details and functionality of the parts without departing from the inventive concepts disclosed herein. Methods may vary as to details, partitioning, repetition, step inclusion, and the order of the acts, without departing from the inventive concepts disclosed herein.

The present invention provides a system and method for using cell phones to play lottery and casino-style games remotely. It provides for both location and age verification which enables game operators in the U.S., subject to U.S. laws, to lawfully allow remote gaming.

FIG. 1 lists cell phone capabilities. To be usable with the present invention, the cell phone must be E-911 compliant. E-911 compliant phones are enabled to report the phone's location within a specified number of yards (see the reference article filed with provisional application 60/426,570 filed on Nov. 14, 2002, incorporated herein in its entirety by explicit reference). This information will be used by the system of the present invention to identify the legal jurisdiction from which the call is being made, which then enables the system to determine the applicable gaming laws in the caller's location.

The system of the present invention, through software programming, will be enabled to handle questionable or gray areas. An example of a potentially gray area would be locations too close to a jurisdictional boundary to make a definitive jurisdictional determination. The program will make a decision based on all available and relevant information. Other relevant information includes the competing or next nearest jurisdiction, which could be used to determine the most restrictive gaming laws possibly applicable to the caller. Other factors may include the type of locator technology being used and its known error margin, etc. All such information will be used to make a best reasonable jurisdictional determination.

Continuing with FIG. 1, all cell phones usable with the present invention will need to be E-911 compliant for locating purposes (calls from non E-911 compliant phones will be politely terminated). However, the level of functionality other than E-911 compliance may vary. Basic cell phones will need to enable text messaging, called functional level 1 phones. This allows non-voice numerical and textual communications between the phone and the gaming system, which is needed to enter and confirm numerical input. Level 2 phones are enabled to run downloadable software programs, which enables entertaining game play in conjunction with the gaming site. Level 3 phones have built-in digital cameras. This enables the use of facial recognition for biometrics. Finally, level 4 phones (which may overlap with level 1, level 2, or level 3 phones) have dedicated non-volatile RAM available for gaming (including lottery) applications. This enables software to store game results (including lottery numbers played, lottery results, game play credits, and other game play state) in non-volatile RAM. By using non-volatile RAM, the phone can be used to not only purchase lottery tickets and play games, but also as the player's data recorder for winnings, interim results, etc. For example, a player could purchase a number of lottery tickets for a lottery to be drawn in several day's time. In addition to the ticket numbers, an ID associated with the lottery drawing (perhaps made up of the drawing date) will also be stored. In one embodiment, the player then calls into the lottery and downloads the winning numbers for that lottery. The downloaded numbers are compared to the numbers stored in non-volatile RAM and the player notified if there is a match. In a preferred embodiment, the lottery system's telephonic interface will have the player's cell phone number (as part of the ticket purchase); after the drawing, the lottery system will call the player's cell and when the player answers will download the winning numbers to the phone. The phone (the software program running on the phone's hardware) will then compare the downloaded numbers and compare with the stored numbers. Any winners are brought to the player's attention. Losers are purged, to save memory space. Alternately, the player may manually purge stored numbers using a menu-driven interface.

Figure 2:
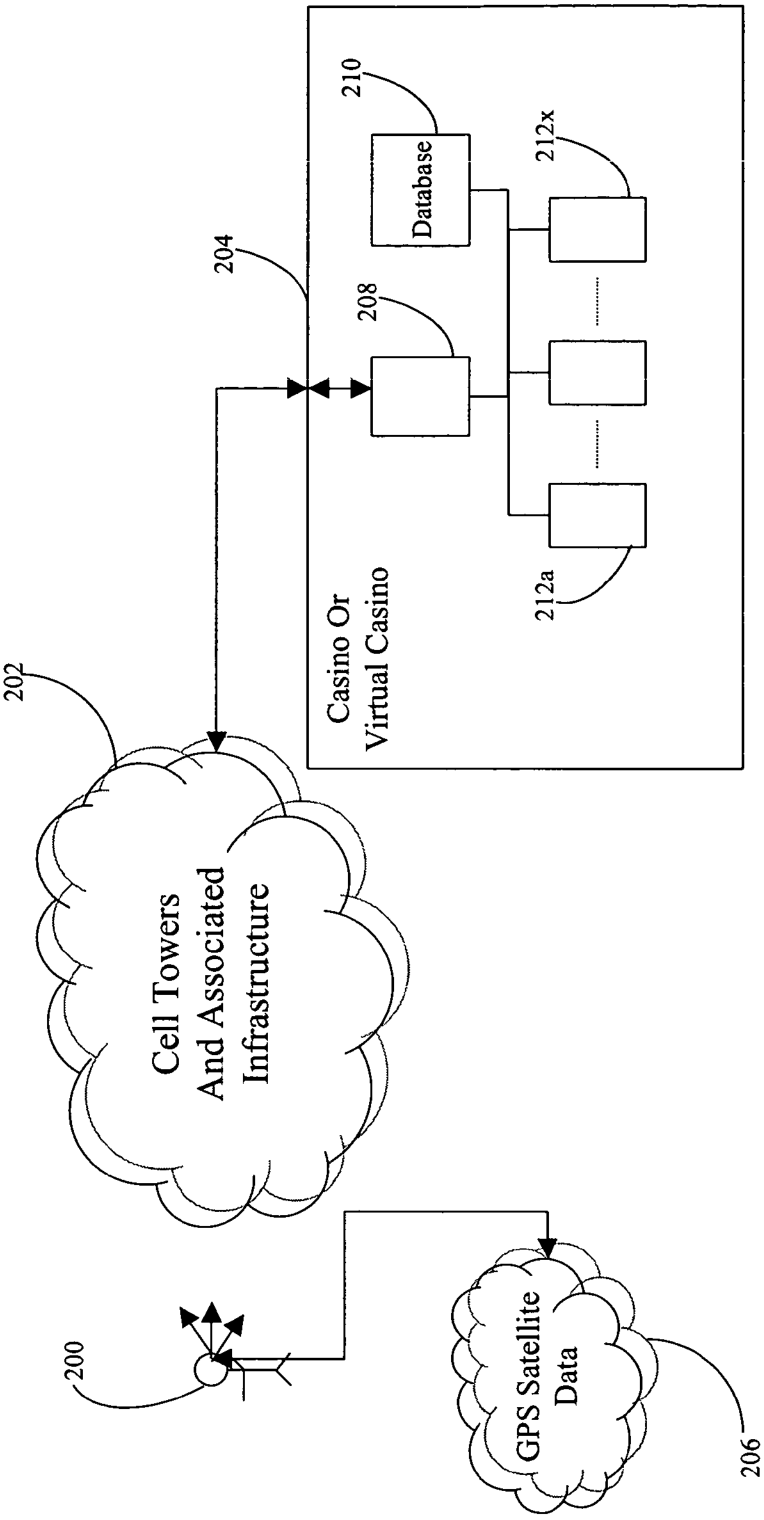
FIG. 2 is a block diagram of a cell phone based system according to the present invention.

FIG. 2 is a block diagram of a lottery sales or gaming system using a cell phone in accordance with the present invention. Player 200 has a cell phone, sending radio signals indicated by the plurality of arrows near player 200's ear. The cell phone signals are received by cell phone infrastructure 202, and depending on the location technology used, GPS data 206 may also be used. Cell phone infrastructure 202 enables a phone call to be placed to casino 204 (this may be a virtual or actual casino). Inside casino 204 the incoming call is connected to a receiver/processor 208. Receiver 208 is operably connected to a LAN inside the casino (or virtual casino), being able to communicate with database machine 210 and individual gaming units (servers) 212*a* through 212*x*. Depending on the size of the installation, the entities shown as separate computers on a LAN my be larger or fewer in number, scaled to the services to be provided.

Database machine 210 carries the data needed by the software running on receiver 208 to make decisions about a caller's location (what gaming may be done, if any, in the caller's jurisdiction). Note that the plurality of gaming servers 212*a*–212*x* can be used to provide games allowed in different jurisdictions, such as full Nevada-style games (Class III games), lottery and lottery-style games (central-determination based games), bingo-based games (Class II games), or any other classification allowed by U.S. jurisdictions (such as the Texas hybrid games). Once a caller's location has been determined using the location/jurisdiction data in database 210 (including the determination of which games, lotteries, or events to allow or not allow the caller to place bets on), some check on the caller's age may be made. The first check can be for the phones user to input a PIN, which is checked against the same database record for the incoming call (the phone number of the caller), its current location, and now a PIN input by the caller. If the caller does not have a PIN, the system will ask the user (using text messaging or an automated voice response system, such as is now common with voicemail systems and call-in help desk systems) to set one up. The caller will chose a PIN that meets the requirements of the system (for example, at least 4 digits without more than 2 repeated numbers).

Further identification will be optional, depending on the requirements of the lottery or gaming system to which it is being attached. For example, if there is a requirement that the caller/player be 18 or older, the system may then require a credit card or driver's license ID number, which can be checked using any number of currently available commercial databases. Each implementation will need to make a determination of what commercially available (or locally developed) identity-related databases will be used, and therefore what information will be requested from the caller who is initializing an account.

Receiver 208 is further enabled to make use of any biometric data available from the caller's cell phone. Voice is always available, and will be the basic biometric. As is known in the biometric arts voice printing is inexact, where many people will tend to be mapped to a target voice pattern. Thus, voice recognition is not a good choice for primary identification; however it is very useful as a secondary identifier. In the case of the system of the present invention, receiver 208 will ask caller 200 for a PIN. The PIN is used with the callers' phone number in database 210 to identify a player. After initial identification, and assuming some game play will occur, receiver 208 will instruct player 200 to say a specific phrase into their phone. Upon each game play occurrence, player 200 will need to repeat the phrase to confirm the player initially identified as the caller is still the person who is placing bets (or carrying out other game play).

This is what is meant by a secondary identifier; in this case it will also be a biometric identifier. Once a player is identified by other means, a voice check will reasonably confirm the same player is continuing to play. For the relatively short time period involved in a single game play session, a player's voice will remain fairly constant; any noticeable change in voice tones will indicate another person is trying to "piggyback" game play using the initial player's identification. Upon termination of the session, the voice pattern is erased; it will be regenerated by the player at the start of each game session. This keeps storage under control, as well as obviating the need to account for a person's normal voice variations, including having a cold, allergies, normal stress variations, etc. FIG. 3 lists the currently enabled secondary biometric identifiers, including voice (the default), facial recognition (for level 3 cell phones), and fingerprints (needs a plug-in module).

Figure 4:
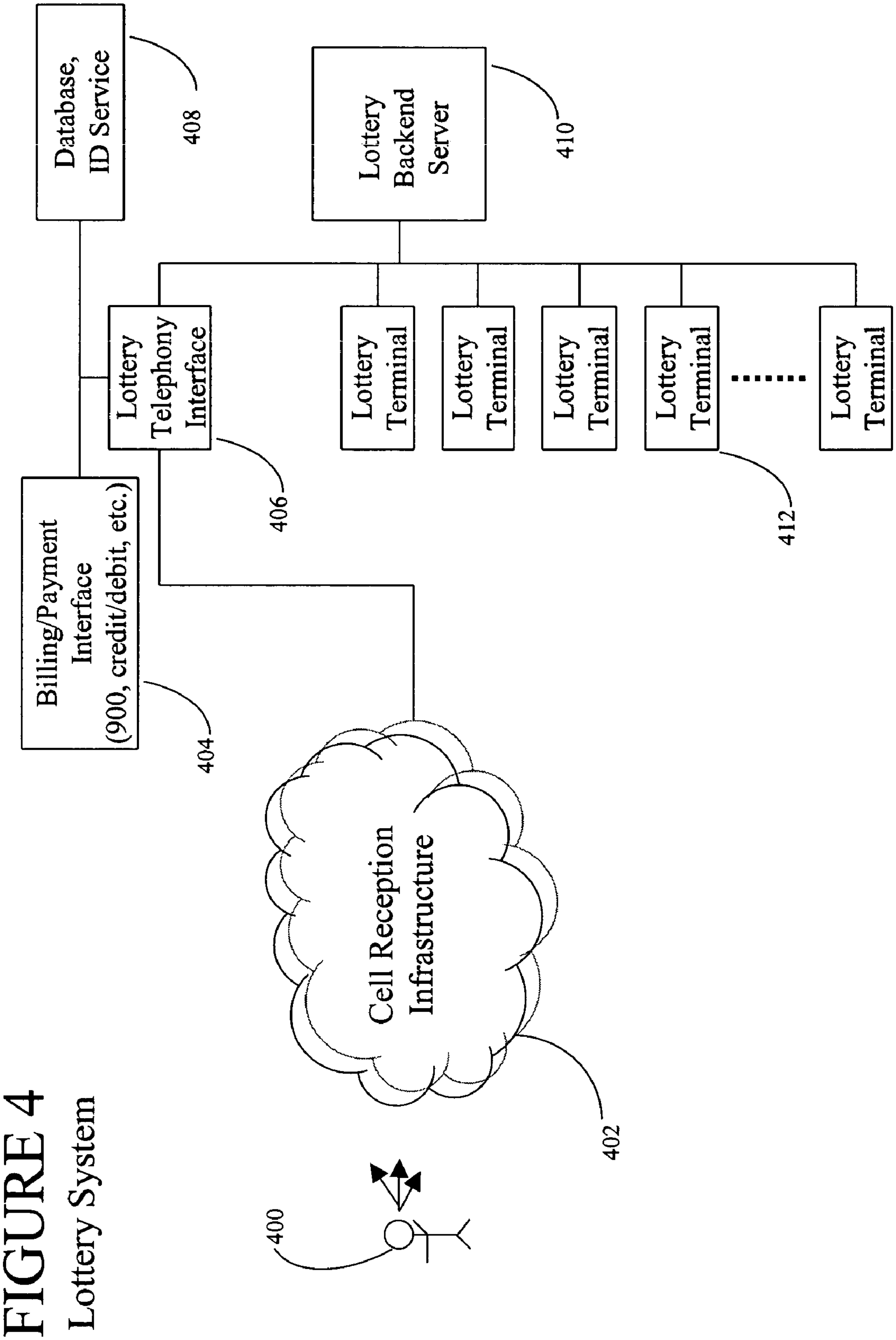
FIG. 4 is a block diagram of a cell phone based lottery system according to the present invention.

FIG. 4 is a block diagram of a lottery ticket sales system according to the present invention. Person 400 uses their cell phone, connecting through cell phone infrastructure 402 to lottery system telephony interface 406. It is expected that in the future, the lottery system, run from lottery server 410, will have both traditional lottery terminals 412 as well as a telephony interface 406. In the near-term, it is expected that telephony interface 406 will be a separate system, enabled to interface to the lottery system as a terminal. Regulatory issues will be addressed as needed (may prevent a direct electronic connection in some jurisdictions, requiring the use of an intermediate terminal/system such as 406). In addition to telephony interface 406, there will be a billing interface 404 and optionally an ID database 408. Note that these are shown as connected to telephony interface 406, and not to the lottery system. In the future, as the system becomes more integrated, these functions may be incorporated into the lottery system itself. It is expected that in the near-term, these functions will be carried out separately from me typical lottery system; once a person's age or other criteria is ascertained and ability to be billed is confirmed, then the cell phone lottery interface system (including the optional ID database and billing system) will electronically purchase lottery tickets from the lottery system.

In addition to the functions just mentioned, in one preferred embodiment the ID database 408 will keep, in addition to a player's PIN, the player's cell phone number, mailing address, payment method (credit card, debit card, direct checking account withdrawal, an adder to the caller's phone bill either directly or through a 900 service, etc.), and a record of lottery ticket purchases (lottery number, game entered, ticket purchase time, etc.) which will be purged at the end of each lottery drawing of non-winning numbers. The database will receive the results of lottery drawings from the lottery system electronically, and will use the database to inform each participant (at their choice) of both winning numbers and if they in particular have any winning tickets.

Figure 5:
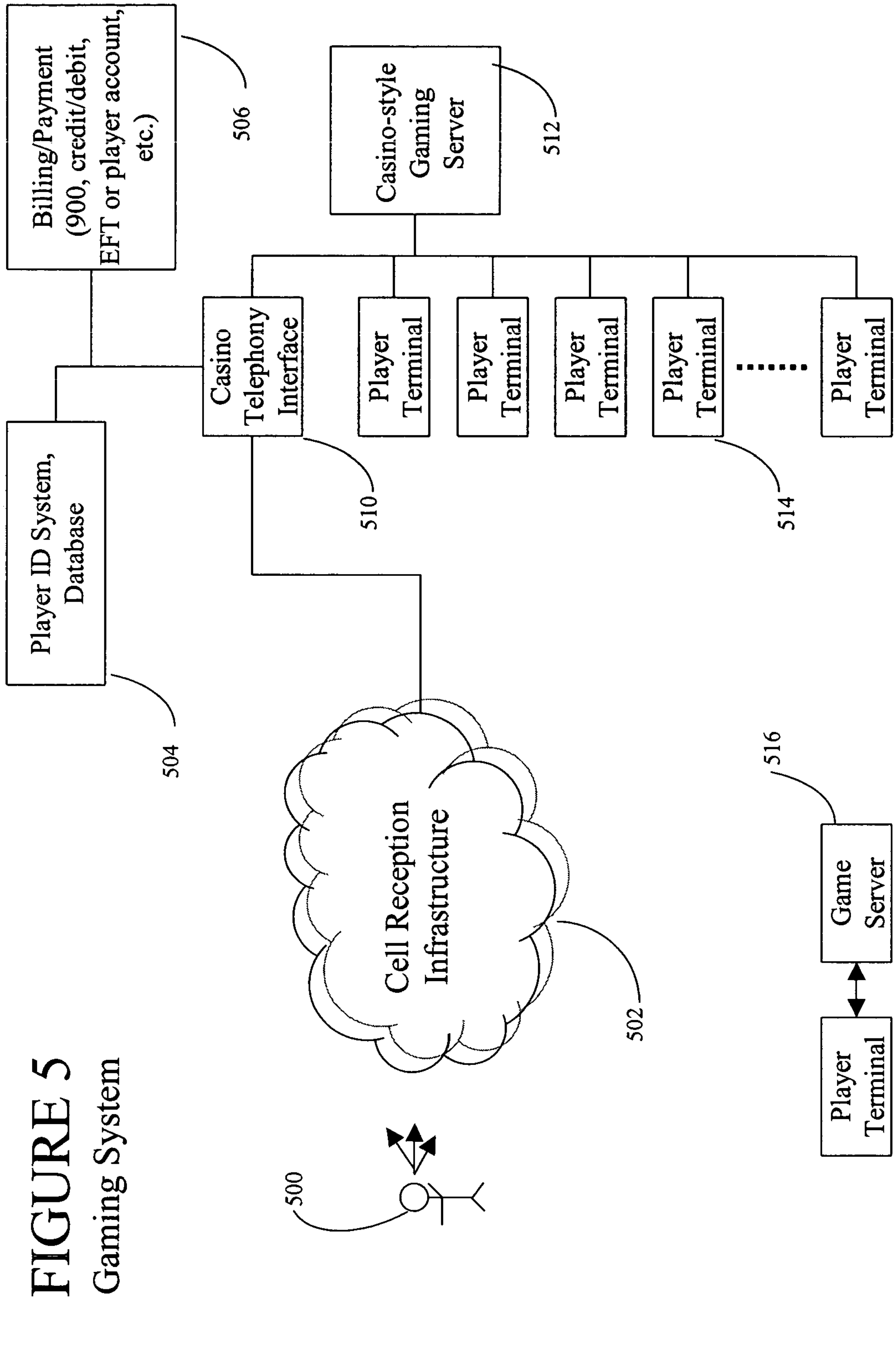
FIG. 5 is a block diagram of a cell phone based gaming system according to the present invention.

FIG. 5 shows a remote casino gaming system according to the present invention. It shares many primary components of the lottery system shown in FIG. 4, including cell phone player/user 500 calling an on-line casino via cell phone infrastructure 502 to casino telephony interface 510. There is a billing interface 506 and a player/user database 504. The casino itself may be a virtual casino or a combination physical casino and virtual casino. In one embodiment, there will be a gaming server 512 which interfaces to both player terminals 514 or virtual game servers 516 (516 points to the fact that any player terminal connected to server 512 may alternatively be a specific game server). Database 504 uses the E-911 location system to determine a current physical location of the caller, maps the location to a jurisdiction, and then to that jurisdiction's gambling laws. Server 512 enables connections to game servers 516 that play games that are allowed by the laws of the jurisdiction in which the caller is located.

Casino game play is enabled by a level 2 cell phone, which allows display software to be downloaded to the phone to show the results of the game play in a realistic manner. For security reasons, one preferred embodiment will have all game play results be determined at the central server sites; the results are then sent and displayed on the player's cell phone. If security layers become computationally more efficient in cell phones through dedicated hardware support, a future preferred embodiment may allow locally derived results.

In addition to the data kept on database 506 as for the lottery system, in one preferred embodiment database 506 will also be an EFT account for casino players. A player will transfer money into the account via a credit/debit card or other means, and then will maintain an on-going balance as games are played. This is greatly preferred over attempting to constantly make credits and withdrawals to a credit card or checking account.

Figure 6:
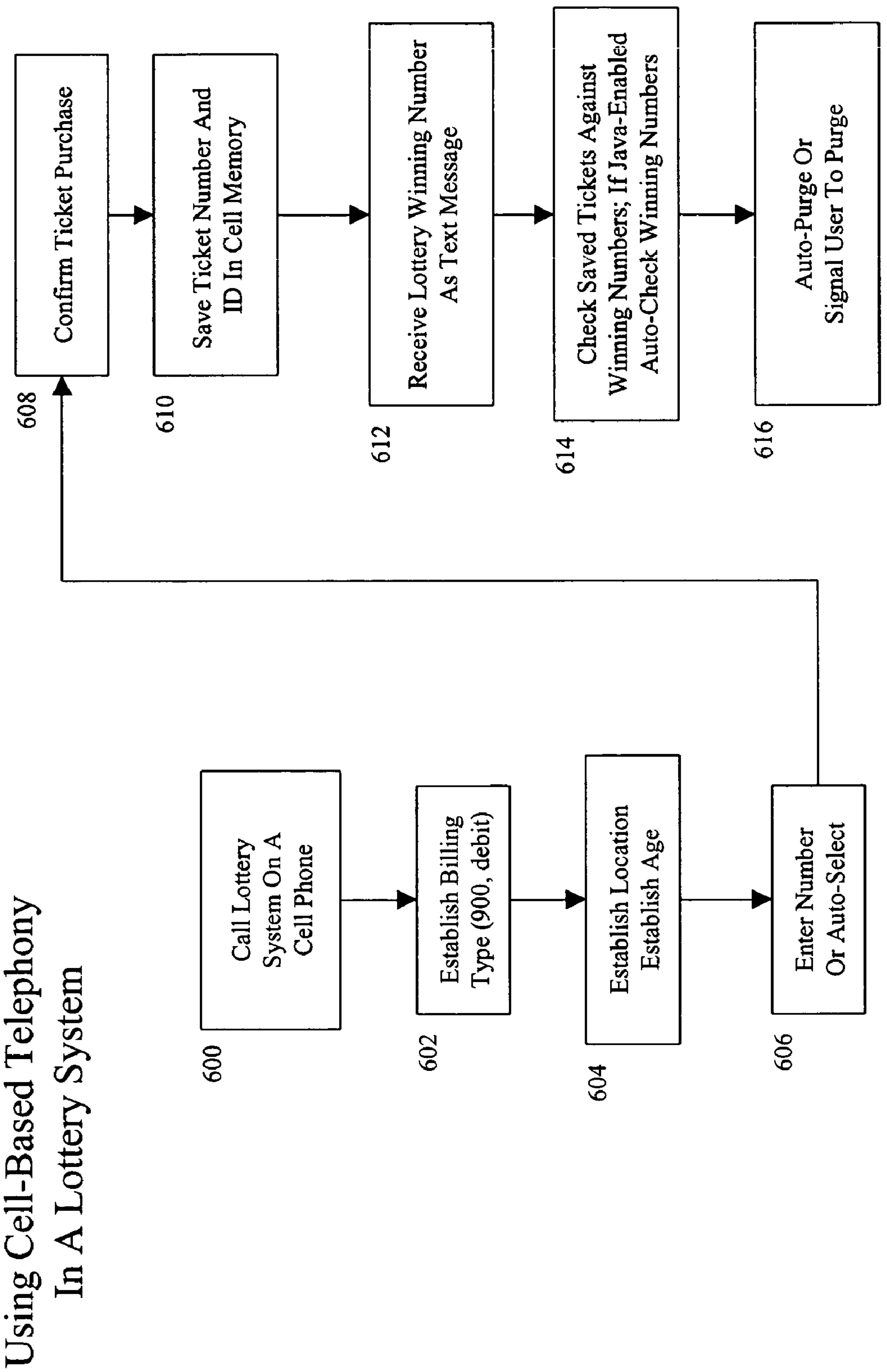
FIG. 6 is a flow diagram of lottery system according to the present invention.

FIG. 6 shows a method of player use of a cell phone lottery system according to the present invention. Stating at box 600, a cell phone user places a call to a lottery system. Upon being connected to the called phone number, several things happen. Continuing into box 602, a billing mode is established. Sometimes this is obvious, as well the call is made through a 900 number. If the call is made through a non-automated-billing number, then another payment mode must be enabled. This will typically be either credit/debit cards or direct withdrawal from a checking account. Continuing into box 604, a player's age and/or location is established. For lottery systems, the location component is expected to be easier than for on-line gaming due to the large number of state-wide and multi-state jurisdictions that allow lotteries. Further, if the caller uses a credit or debit card, not issued to people under 18, the age verification is far more straightforward than is the case with on-line casino-style gaming, which may require more rigorous age verification and further be able to distinguish between 18-, 19-, 20- and 21-year olds (rather than simply 18 and over), depending on the jurisdictions involved. Also note that in one preferred embodiment, transactions can be capped to a number of ticket purchases or dollar total amount per time period, chosen by the player or as mandated by the local jurisdiction, which can be enforced using the data in the database.

Continuing on with box 606, the caller interacts with the lottery system using text messaging and/or downloaded menus (preferable when using a level 2 cell phone), and picks a lottery number or indicates the lottery system is to generate a randomly generated number. Continuing into box 608, the lottery telephony system interfaces with the lottery itself and purchases the requested tickets, then indicates to the caller that the lottery tickets have been purchased (including what numbers are on the tickets).

Proceeding into box 610, the ticket information is saved in the dedicated non-volatile RAM, if so equipped, for later reference by the lottery menu system downloaded onto the phone. Box 610 is left for box 612. Box 612 corresponds to the actions taken for the lottery telephony system to receive the winning lottery numbers from the lottery system in some kind of machine-readable format, then transmit the numbers to each cell phone player's phone. This is done using the data in the database for each identified user (there will be users/players who, for their own reasons, do not want to be entered into the player ID database permanently). Continuing into box 614, if the phone is application enabled, the application ("applet") will compare the lottery numbers previously chosen by the player with the winning numbers and indicate any winning ticket, as well as indicating there are no winners.

Finally, the stored numbers are either auto-purged (by the application) or manually purged by the cell phone user, completing the lottery game use cycle for this drawing. Note that there well may be overlapping lottery entries; that is, a player may purchase lottery tickets for more than one lottery drawing at a time. If the cell phone is a level 2 phone with level 4 memory, then the multiple drawings can readily be managed by the application software. If the phone does not have dedicated memory, then in one preferred embodiment the purchased tickets are kept on the lottery telephony database, along with player ID data. Applications programs running on the same computer as the database can then check for winning entries, and indicate to the player when they next call in that they purchased a winning ticket.

Figure 7:
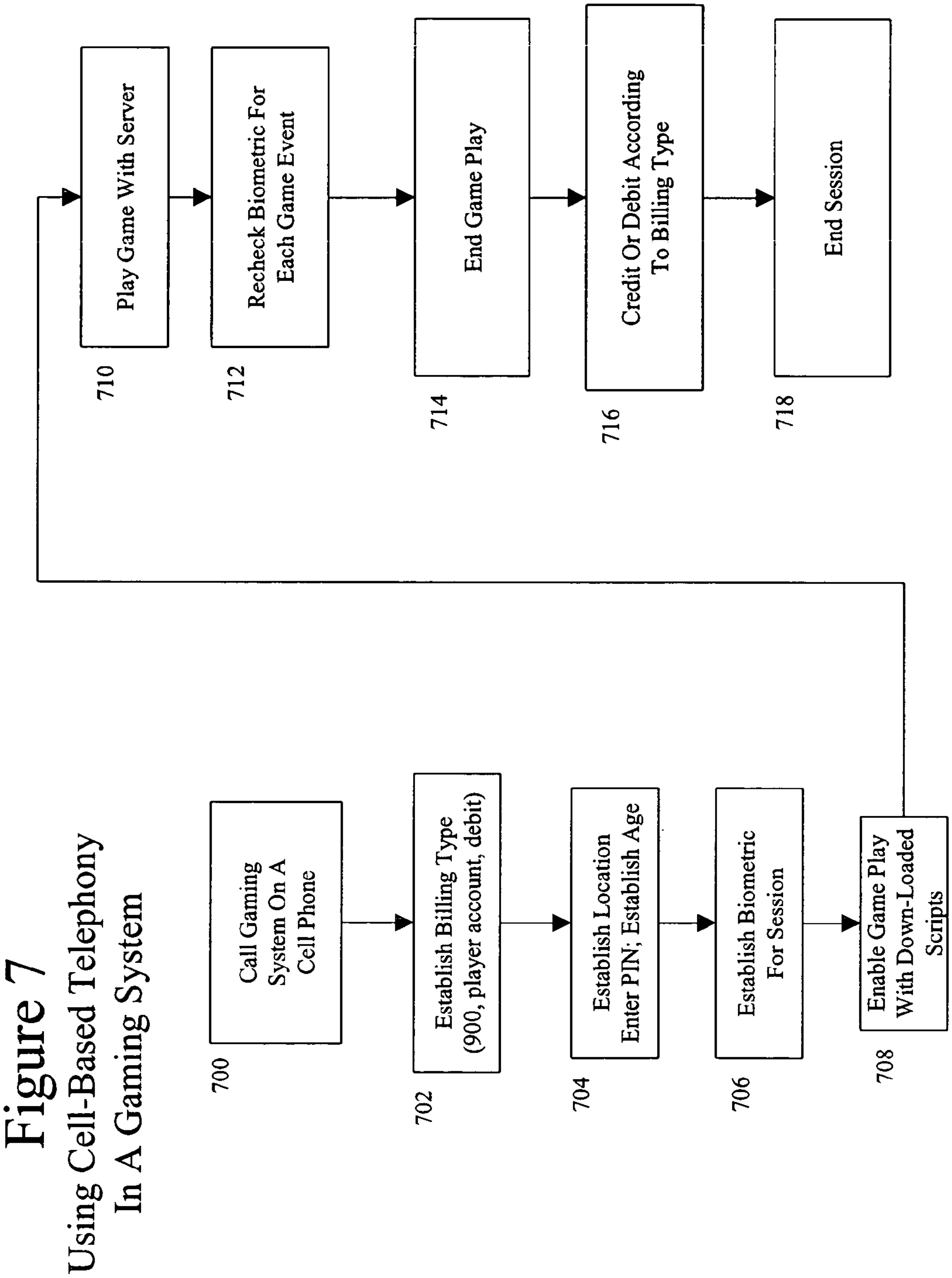
FIG. 7 is a flow diagram of gaming system according to the present invention.

FIG. 7 illustrates a method of playing casino-style games remotely using a cell phone. In many ways it is similar to the use of cell phones used to purchase lottery tickets, while requiring higher granularity in age determination, jurisdictional boundaries, and a determination of what types of games are allowed in a particular jurisdiction (Nevada-style games, central determination class III games, class II games such as bingo, or other). Starting at box 700, a player calls a gaming system on her or his cell phone. After box 700, several actions are taken which determine payment methods, location determination, age determination, allowed games, and any other determinations needed before a gaming system can enable game play of allowed games in the caller's jurisdiction. These actions correspond to boxes 702–704. The actions corresponding to boxes 702 and 704 include establishing a calling player's ID in a player's information database, typically using the calling number ("caller ID") and a PIN entered by the player after the system answers the call. This will identify a specific user or player account. The location of the player is queried from the phone, and the information used to determine the players preferred billing venue (phone bill adder, credit/debit card, player EFT account, etc.) and games that can be played. The next set of actions, corresponding to box 706, are to establish a biometric for use with the present gaming session. The default biometric, usable with all cell phones, is a voice biometric. For level 3 cell phones, facial recognition may be used instead. If there is a finger print reader plug-in module or, in the future, a print reader on the phone, a fingerprint can be used. In any case, data is taken from for the biometric to be used and is stored (for this session) in the player's database entry, along with the player's other information.

Continuing to the actions corresponding to box 708, the cell phone is enabled to play the games allowed in the jurisdiction from which the call is being made. This may be done by downloading specific game software real-time, or, enabling game play at the virtual casino end only on allowed games and signaling the cell phone which game or games can be played (i.e., a bit string turning certain games on or off). The enabled games are now playable by the cell phone user, corresponding to the actions in box 710. For an enabled game the user interacts with the a game server, playing the game until the plyer wishes to stop. During game play, the actions corresponding to box 712 are repeated as often as necessary. These actions are for the player to enter, as required by the biometric, a biometric read for each bet made. This provides on-going assurance that the bets are being made by the same person that logged into the system on their cell phone. In the case of a voice pattern, the person will speak the same phrase into the phone to bet; for a fingerprint or facial recognition biometric, the player will press a fingerprint reader or click a facial picture. The data is compared to that on-file for this session, and if found within range allows this bet to be made (preferably logging the ID check as well as the bet details). The player continues to play until they are finished, and signal the game session is over (box 714). This includes, but is not limited to, loss of signal or a hang-up signal.

From the system's perspective, the game session is not quite over, even though game play is (and the player has disconnected). The player's accounts are updated (credited or billed, or if a local player account, simply tallied) in accordance with the player's choice of billing types. This signals the end of the session, corresponding to box 718.

The invention claimed is:

1. A method for remote betting using cell phones comprising:

providing a telephony interface configured to receive voice and location data from a cell phone associative with a phone session, determining gaming restrictions, if any, from said cell phone location data;

associating applicable gaming restrictions, if any, with said phone session;

receiving a first identifier through said telephony interface associative with said phone session;

associating said first identifier with an age;

using said age and said applicable gaming restrictions to determine allowable gaming-related actions;

receiving a second identifier through said telephony interface associative with said phone session, said second identifier being a biometric identifier;

associating said second identifier with said phone call;

receiving gaming-relating data associative with said phone session;

using said gaming-related data for at least one of placing bets or purchasing lottery tickets in accordance with said applicable gaming restrictions, if any;

receiving a further biometric identifier and comparing said second identifier with said further identifier upon one of starting gaming-related data reception or upon ending gaming-related data reception; and rejecting said gaming-related data if said further biometric identifier and said second biometric identifier do not match.

2. A remote-betting system using a cell phone comprising:

a telephony interface configured to receive voice and location data from a cell phone;

one of a database or settable state operative with said telephony interface and configured to associate voice and location data with a phone session;

a program operative with said database or said settable state configured to receive a first identifier through said telephony interface associative with said phone session, associate said first identifier with an age, determine gaming restrictions based on said cell phone location data and said age, to receive gaming-relating data associative with said phone session and to send allowed gaming-related data to at least one of a lottery interface or a gaming interface to enable betting thereby, where said program is further configured to receive a second identifier through said telephony interface associative with said phone session where said second identifier is a biometric identifier, and is further configured to receive a later-submitted biometric identifier and to compare said second identifier with said later-submitted identifier and to reject any gaming-related data if said later-submitted biometric identifier and said second biometric identifier do not match.

3. A system for cell phone betting comprising:

means for receiving voice and location data from a cell phone associative with a phone session;

means for receiving a first identifier associative with said phone session;

means for associating an age with said first identifier;

means for determining applicable gaming restrictions using said cell phone location data and said age and associating said restrictions with said phone session;

means for receiving gaming-relating data associative with said phone session;

means for using said gaming-related data for placing bets or purchasing lottery tickets in accordance with said applicable gaming restrictions;

means for sending data receivable by a cell phone communicating gaming-related restrictions;

means for receiving a second identifier associative with said phone session, said second identifier being a biometric identifier;

means for receiving a further biometric identifier and comparing said second identifier with said further identifier and rejecting any gaming-related data if said further biometric identifier and said second biometric identifier do not match.

* * * * *

UNITED STATES PATENT AND TRADEMARK OFFICE

CERTIFICATE OF CORRECTION

PATENT NO. : 7,035,626 B1
APPLICATION NO. : 10/708272
DATED : April 25, 2006
INVENTOR(S) : Robert A. Luciano, Jr.

It is certified that error appears in the above-identified patent and that said Letters Patent is hereby corrected as shown below:

Column 5
Line 40, change “me” to --the--.

Column 7
Line 67, change “plyer” to --player--.

Column 8
Line 13, change “they are” to --he is--.
Line 13, change “signal” to --signals--.

Column 8
Claim 1, line 41, change “gaming-relating” to --gaming-related--.
Claim 2, line 64, change “gaming-relating” to --gaming-related--.

Column 10
Claim 3, line 1, change “gaming-relating” to --gaming-related--.

Signed and Sealed this

Eleventh Day of July, 2006

JON W. DUDAS
*Director of the United States Patent and Trademark Office*